United States Patent [19]
Wagner

[11] 3,712,715
[45] Jan. 23, 1973

[54] MULTIPLE RANGE REAR VISION MIRROR

[76] Inventor: Carl E. Wagner, 6190 West Jefferson Place, Lakewood, Colo. 80226

[22] Filed: March 22, 1972

[21] Appl. No.: 237,087

[52] U.S. Cl. .................... 350/304, 350/61, 350/299
[51] Int. Cl. ............................................. G02b 5/08
[58] Field of Search......350/288, 299, 301, 302, 303, 350/304, 307, 61, 65–67; 248/481, 482

[56] References Cited

UNITED STATES PATENTS

| | | | |
|---|---|---|---|
| 3,656,830 | 4/1972 | Kurschner | 350/67 |
| 3,682,536 | 8/1972 | Whitman | 350/307 |

Primary Examiner—David Schonberg
Assistant Examiner—Michael J. Tokar
Attorney—Richard D. Law

[57] ABSTRACT

A rear vision mirror, normally mounted on the exterior of a vehicle, includes at least two mirrors mounted on a single central post and contained in a housing with one transparent side, providing adjustment means for each mirror operable through holes in the housing.

6 Claims, 6 Drawing Figures

PATENTED JAN 23 1973

3,712,715

MULTIPLE RANGE REAR VISION MIRROR

This invention relates to a rear vision mirror that includes a multiple section mirror providing full rear and quarter rear coverage of the sides of the vehicle. The mirrors are mounted in a housing with a transparent front to provide protection for the mirrors and prevent them from being knocked out of adjustment. The mirrors are mounted on a center post and include means for individual adjustment of the mirrors through the housing.

Included among the objects and advantages of the present invention is to provide a rear vision mirror which is particularly adaptable for exterior mounting on a vehicle.

Yet another object of the invention is to provide a rear vision mirror arranged in a protective housing to prevent accidental misalignment of the mirrors.

Yet another object of the invention is to provide a multiple section rear vision mirror arranged for exterior mounting to provide full vision coverage of the particular side of the vehicle.

Still another object of the invention is to provide a covered multi-section mirror for exterior installation on a vehicle and provided with individual adjustments for the mirrors without removing the covering.

A further object of the invention is to provide a three section mirror for either side of a vehicle to give full rear vision coverage of either such side of the vehicle and of the area quartering outwardly from either side of the rear of the vehicle.

An additional object of the invention is to provide a multi-section rear vision mirror having at least three sections all of which are individually mounted on a single support post, and all are contained in a housing having a transparent side for vision to the mirrors.

These and other objects and advantages of the invention may be readily ascertained by referring to the following description and appended illustrations in which.

The form of the invention selected for illustration, is a three section rear vision mirror; however, it is obvious that the device may be made with two or more sections depending on the coverage deemed necessary by the manufacturer of the device. The device provides a housing for protecting the mirrors, and individual mirror adjustment is available through opening in the rear of the mirror housing.

As illustrated, the unit includes an arcuate housing 10 with an open side closed by a transparent covering 12. The ends of the housing are covered by end covers 14 and 16.

Figure 1:
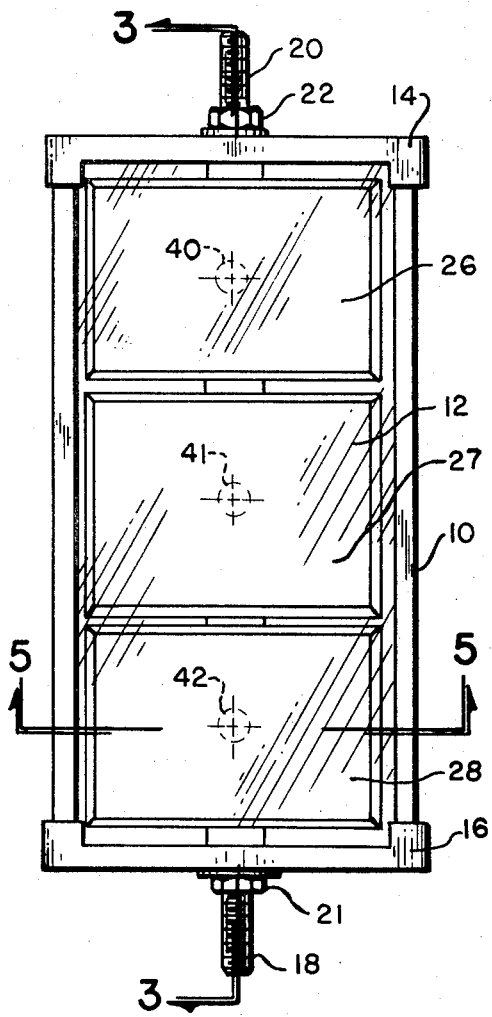
FIG. 1 is a front elevational view of a rear vision mirror arrangement according to the invention.
Figure 2:
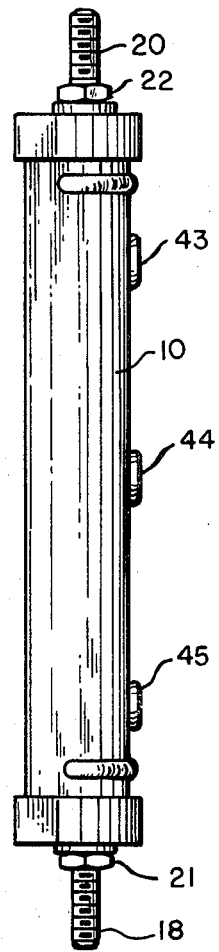
FIG. 2 is a side elevational view of the device of FIG. 1.
Figure 3:
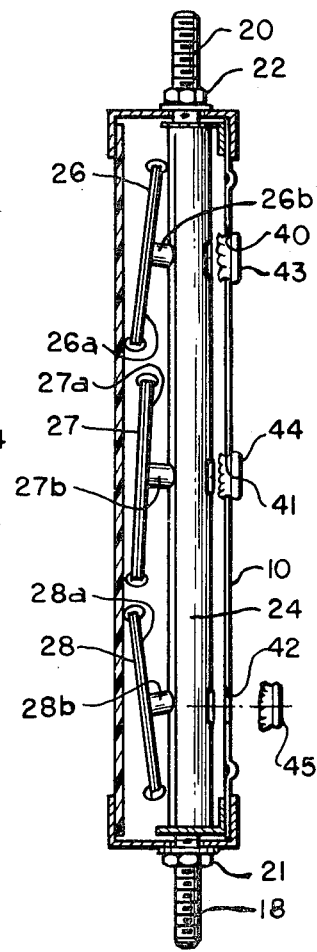
FIG. 3 is a side elevational view, in cross section, illustrating the mounting of the mirrors on a single center post.
Figure 4:
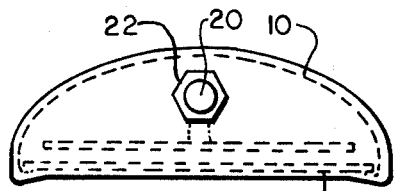
FIG. 4 is a top plan view of the rear vision mirror according to the invention.
Figure 5:
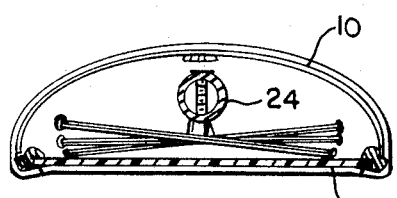
FIG. 5 is a top plan, cross-sectional view of the device of FIG. 1 taken along section lines 5—5.

The transparent covering 12 may be set in rubber, plastic or the like to provide an essentially water proof and shock proof setting for the transparent material. A mounting post extends through the housing, and includes threaded ends 18 and 20 which are arranged to be mounted on a bracket (not shown) attached to the vehicle. A nut 21 threaded on the post end 18 and a similar nut 22 threaded on the upper post end 22 provides means for securing the ends 14 and 16 on the housing cover 10. As shown in FIG. 3, a center post section 24 is secured to the threaded post end 18 at the one end and to threaded post end 20 at the opposite end. The center section 24 is a hollow tubular member, and it may be of slightly larger diameter than the threaded post 18 and 20.

Figure 6:
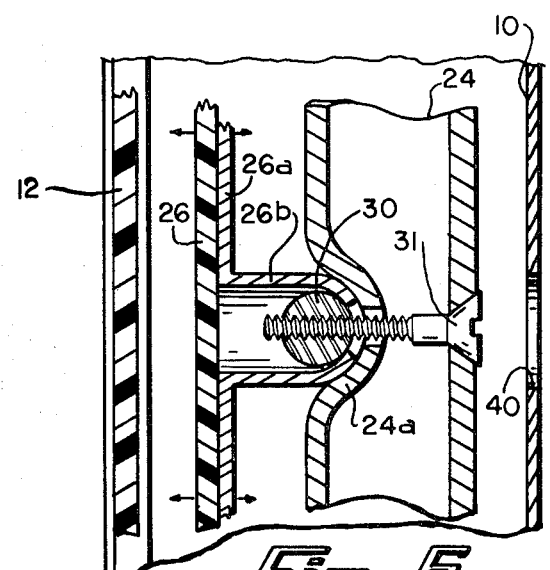
FIG. 6 is an enlarged cross-sectional, side elevational detail of an individual mirror mounting arrangement on a single center post, according to the invention.

The device selected for illustrating the invention, includes three mirrors, 26, 27 and 28. Each mirror is mounted in a frame, for example, mirror 26 is mounted in frame 26a which includes a stub post 26b, shown in detail in FIG. 6. The stub post 26b is attached to the post 24 by means of a threaded ball 30, and a screw 31 threaded into the ball which is mounted inside the post 26b. The tube 24 is provided with an indent 24a which accommodates the rounded end of the post 26b.

To secure the mirror 26 in place, the screw 31 is pulled down tight into the ball 30 which forms a tight friction fit between the rounded end of the post 26b and the indent 24a. The end of the post 26b and/or indent 24a may be knurled to provide the positive friction fit, which will not shift under the vibration of a vehicle in movement down the road.

Each mirror is provided with a frame and post arrangement similar to that described for mirror 26, thus mirror 27 includes a frame 27a and a post 27b. In a similar manner, mirror 28 is mounted in a frame 28a having a post 28b. All the mirrors are mounted in similar manner. To provide access for the adjusting screw for each mirror, an opening is provided in the housing directly over the screw. Thus an opening 40 provides direct access to the screw 31, an opening 41 provides access to the screw for mirror 27, and an opening 42 provides means for an access to the screw of the mirror 28. A cover 43 provides a cover for the opening 40, a cover 44 for the opening 41 and a cover 45 for the opening 42.

For use, the unit is assembled with the mirrors mounted on the center post, the housing is placed with the posts 18 and 20 mounted in a truck or passenger car rear view bracket which is attached to the door or other part of the vehicle. Lock washers and nuts secure the posts in the bracket. The housing is adjusted with the transparent covering 12 pointed generally in a rearward direction of the vehicle, and the unit is tightened in place. Individual adjustment of the mirror is accomplished by removing each cover over the opening in the rear of the housing, loosening the screw and then using a screw driver to tile the mirror in the desired position. As illustrated in FIG. 3, the upper mirror is arranged to point outwardly and slightly upwardly to give the driver of a vehicle a view of the outer quadrant of the rear of the vehicle. The center mirror 27 is arranged straight back alongside the vehicle. The mirror 28 is arranged downwardly and inwardly of the vehicle to cover a blind spot in normal rear view mirrors which is directly alongside the vehicle and immediately in back of the driver. Once adjusted the screws are tightened on each mirror and the covers replaced over the openings. The housing around the mirrors prevents the mirrors from being actually knocked out of adjustment by careless service station attendants or other people in close proximity of the vehicle. The transparent cover keeps the mirrors clean and permits a single cleaning to provide vision through all of the mirrors without jostling the adjustment of the mirrors.

The individual adjustment of the mirrors provides means for accommodating as many mirrors as may be deemed necessary on the center post, thus two, three, four or more mirrors may be utilized where coverage of that quantity of area is desired. Normally, in a truck, for example, two mirrors are provided, one on the driver's side and one on the opposite side of the driver's compartment so that the driver will have a view of both sides of the vehicle. The same is true for passenger vehicles drawing trailers or the like. The use of a three-section mirror, of course, provides extended coverage of the area which is normally blind to conventional mirrors, even mirrors that utilize the bubble effect intended to provide wide coverage. The bubble completely distorts the view and provides essentially no depth perception. With the device of the present invention the mirrors may be made plain mirrors without any enlargement, or may use one or more enlarging mirrors, or any combination deemed advisable by the manufacturer.

I claim:

1. A rear view mirror for vehicles comprising a housing having at least one transparent side;
a central shaft extending through said housing;
attachment means on each end of said shaft for mounting said housing in bracket means on a vehicle;
a plurality of separate mirrors mounted in said housing arranged for viewing through said transparent side;
each said mirror including a rearward extension;
means adjustably connecting said rearward extension to said shaft;
therebeing a plurality of openings in said housing each in position to permit adjustment of said means adjustably connecting said rearward extension to said shaft; and
a covering for each said opening.

2. A rear view mirror according to claim 1 wherein said central shaft is hollow.

3. A rear view mirror according to claim 1 wherein said attaching means includes a threaded member frictionally securing said rearward extension to said shaft.

4. A rear view mirror according to claim 3 wherein said central shaft is hollow and includes spaced indentations accommodating said rearward extension of each said mirror and said threaded member extends through said shaft into said rearward extensions.

5. A rear view mirror according to claim 4 wherein each said rearward extension is hollow and a spherical member having a threaded bore therein is connected to said threaded member for securing each said mirror in position.

6. A rear view mirror according to claim 5 wherein said central shaft is vertically mounted and three mirrors are mounted thereon.

* * * * *